United States Patent
Cohn et al.

(10) Patent No.: US 8,285,924 B1
(45) Date of Patent: *Oct. 9, 2012

(54) CACHE CONTROL SYSTEM

(76) Inventors: Oded Cohn, Haifa (IL); Eliezer Dekel, Haifa (IL); Michael Rodeh, Oshrat (IL)

( * ) Notice: Subject to any disclaimer, the term of this patent is extended or adjusted under 35 U.S.C. 154(b) by 0 days.

This patent is subject to a terminal disclaimer.

(21) Appl. No.: 08/364,334

(22) Filed: Dec. 27, 1994

(30) Foreign Application Priority Data

Feb. 3, 1994 (GB) .................................. 9402054.2

(51) Int. Cl.
*G06F 12/08* (2006.01)
(52) U.S. Cl. ........ 711/113; 711/143; 713/322; 713/323; 713/324
(58) Field of Classification Search .................. 711/143, 711/138, 113, 117, 133, 134, 137; 713/322, 713/323, 324; 710/32
See application file for complete search history.

(56) References Cited

U.S. PATENT DOCUMENTS

| | | | | |
|---|---|---|---|---|
| 3,217,298 A | | 11/1965 | Kilburn et al. ............. | 340/172.5 |
| 4,433,374 A | * | 2/1984 | Hanson ......................... | 395/465 |
| 4,437,155 A | | 3/1984 | Sawyer et al. ................ | 364/200 |
| 5,293,609 A | * | 3/1994 | Shih .............................. | 395/464 |
| 5,410,653 A | * | 4/1995 | Macon, Jr. .................... | 395/250 |
| 5,420,983 A | * | 5/1995 | Noya ............................ | 395/850 |

FOREIGN PATENT DOCUMENTS

| | | |
|---|---|---|
| JP | 4205852 | 7/1992 |
| WO | 9215933 | 9/1992 |

OTHER PUBLICATIONS

Computer Networks, Andrew S. Tanebaum, © 1981 ISBN 0-13-165183-8.*
Computer Society International Conference (COMPCON), vol. 31, 1986, IEEE, Washington D.C., p. 457, by Steve Wallach entitled "The Convex C-1 64-Bit Supercomputer".

* cited by examiner

*Primary Examiner* — Hiep T. Nguyen (57) ABSTRACT

A cache control system is disclosed for use with data storage apparatus having a movably mounted storage element, such as a magnetic or optical disk and solid-state cache memory, in which the storage element is not at operating speed when data access has not occurred during a predetermined time period, comprising means arranged to access data stored on the storage element if a read or write request cannot be satisfied via access to the cache memory and a cache replacement mechanism for transferring data between the cache memory and the storage element to maintain consistency of data therebetween. The system is characterized in that the cache replacement mechanism performs data transfers between the cache memory and the storage element only while the storage element is at operating speed after a read or write request has given rise to an access to the storage element.

12 Claims, 6 Drawing Sheets

CACHE CONTROL SYSTEM

The invention relates to a cache control system for use in data storage apparatus in a computer and, more particularly, to a cache control system which reduces power consumption in such data storage apparatus having a movably mounted storage element, such as a magnetic or optical disk or the like.

The popularity of portable battery-operated computers has made the need to reduce the power consumption of computer systems very important. This is because the capacity of batteries is limited and it is desirable to maximize the amount of time for which the portable computer can be used without having to replace the batteries or to connect the computer to a mains electricity supply in order to recharge the batteries.

In addition, increased attention to environmental and ecological considerations has given rise to the requirement to design desktop personal computers with reduced energy consumption.

Since it usually has moving parts, such as a magnetic or optical disk, the data storage sub-system of such computers is very often a major contributor to the power consumption of the device as a whole.

This invention is directed to the problem of reducing the power consumption of data storage apparatus having a movably mounted element, such as a disk. The invention finds particular application with, but is not limited to, disk storage subsystems for personal and portable computers.

A number of computer data storage systems have been proposed which make use of solid state memory devices as a front end to rotating magnetic disk devices. These systems use a high speed solid state memory unit as a holding area for data stored on relatively lower speed magnetic disk storage, thereby increasing the speed of access as compared to the use solely of relatively lower speed disk storage. Such a system is disclosed, for example, in WO 92/15933.

From a first aspect, this invention provides a cache control system for use with data storage apparatus having a movably mounted storage element and solid-state cache memory, in which data storage apparatus the storage element is not at operating speed when data access has not occurred during a predetermined time period, the cache control system being responsive to read and write requests from a computer and comprising means arranged to access data stored on the storage element if a read or write request cannot be satisfied via access to the cache memory and a cache replacement mechanism for transferring data between the cache memory and the storage element to maintain consistency of data therebetween, characterized in that the cache replacement mechanism is arranged, in operation, to perform data transfers between the cache memory and the storage element only while the storage element is at operating speed after a read or write request has given rise to an access to the storage element.

Power consumption is reduced because disk accesses which are caused by the need to maintain consistency between the data stored in the cache and on the storage element are restricted to occasions when an access to the storage element would be required anyway because a read or write request could not be satisfied from the cache. Since the number of times the storage element has to be accelerated to operating speed is reduced, the power consumption is also reduced.

Thus in one embodiment such a control system takes advantage of the fact that disks of portable workstations are usually turned off if no activity against them takes place during a certain period of time. When the disk is idle, and a Read/Write request is issued, energy has to be spent on accelerating the disk to its operational speed.

The cache is used as a repository enabling small separate Read/Write operations to be performed without activating the disk.

In the apparatus of the present invention, unlike with a conventional cache memory, the cache memory device does not necessarily have to be faster than the data storage. Rather it is sufficient if it is accessible with a lower power consumption.

Unlike a conventional cache control system, a system arranged in accordance with the present invention is not designed to overlap operations. Rather it is designed to effectively batch operations. The prior art cache replacement algorithms tend to use independent activations of the disk by the cache replacement mechanism in the background to ensure that the probability that a read or write request can be satisfied via access to the cache alone is maximized. Since the energy penalty for activating the disk is high, the cache replacement algorithm of this invention is intended to minimize the number of required disk activations rather than minimize the required number of disk accesses as in the prior art.

Suitably, the cache replacement mechanism can be arranged to carry out transfers from the cache memory to the storage element for a predetermined time each time a read or write request has given rise to an access to the storage element.

Thus, it is possible that large chains of accesses to the disk to sequences of segments which are not necessarily sequential will be made because the energy saved by making these accesses after a required disk access amortizes the spin-up energy of the disk.

Preferably, the cache control system comprises means operable to access the data on the storage element without modifying the data in the cache memory if the read or write request involves more than a predetermined amount of data. This is more efficient since it avoids access to the cache where it is clear that it will not be possible to satisfy read or write requests from the cache.

In an advantageous form of the invention the cache control system comprises means to identify a set of sectors associated with each sector and wherein the cache replacement mechanism is operable to transfer all members of the associated set of sectors from the storage element to the cache memory when a read or write request has given rise to the sector being read from the storage element.

Thus, by appropriate maintenance of the sets of associated sectors, use can be made of spatial locality of access to maintain in cache the sectors that are most likely to be accessed at any given time.

Conveniently, the associated sets of sectors can be efficiently maintained by identifying, at any particular time, the sectors that have been accessed in a preceding predetermined time interval and by updating the set of sectors associated with a sector, when a read or write request has given rise to the sector being read from the storage element, by adding to the set the sectors that have been accessed in the preceding predetermined time interval.

Preferably, the updating mechanism is also arranged to determine whether each sector in the associated set has been accessed in the preceding predetermined time period and to remove the sector from the set after determining on a predetermined number of occasions that the sector has not been accessed in the preceding predetermined time period.

In one embodiment the system comprises, for at least a subset of the sectors, means to determine and store an indication whether each sector was accessed on the most recent occasions when it was brought into the cache and the cache replacement mechanism is arranged to transfer a sector from the storage element to the cache memory when a read or write request has given rise to the sector being read from the storage element only if the sector was accessed on the most recent occasions when it was brought into the cache.

This allows the system to identify sectors which, once brought into the cache are not referenced again. If this pattern is repetitively observed these sectors are not brought to the cache to allow better utilization of the cache space.

The invention also provides data storage apparatus comprising such a cache control system, an optical or magnetic disk drive and a non-volatile solid state cache memory. Advantageously, the data storage apparatus is in the form of a disk storage subsystem for use with a personal or portable computer. In this form, the data storage apparatus can be designed to preserve the external interface of the disk subsystem and require no special support at the system level whatsoever, thus enabling the subsystem to directly replace a conventional hard disk drive.

Viewed from another aspect, the invention provides a method for operating data storage apparatus having a movably mounted storage element and solid-state cache memory, in which data storage apparatus the storage element is not at operating speed when data access has not occurred during a predetermined time period, the method comprising accessing data on the storage element in response to a read or write request which cannot be satisfied via access to the cache memory, and transferring data between the cache memory and the storage element to maintain consistency of data therebetween, characterized in that data transfers between the cache memory and the storage element are performed only while the storage element is at operating speed after a read or write request has given rise to an access to the storage element.

An embodiment of the invention will now be described, by way of example only, with reference to the accompanying drawings, wherein:

DETAILED DESCRIPTION

Figure 1:
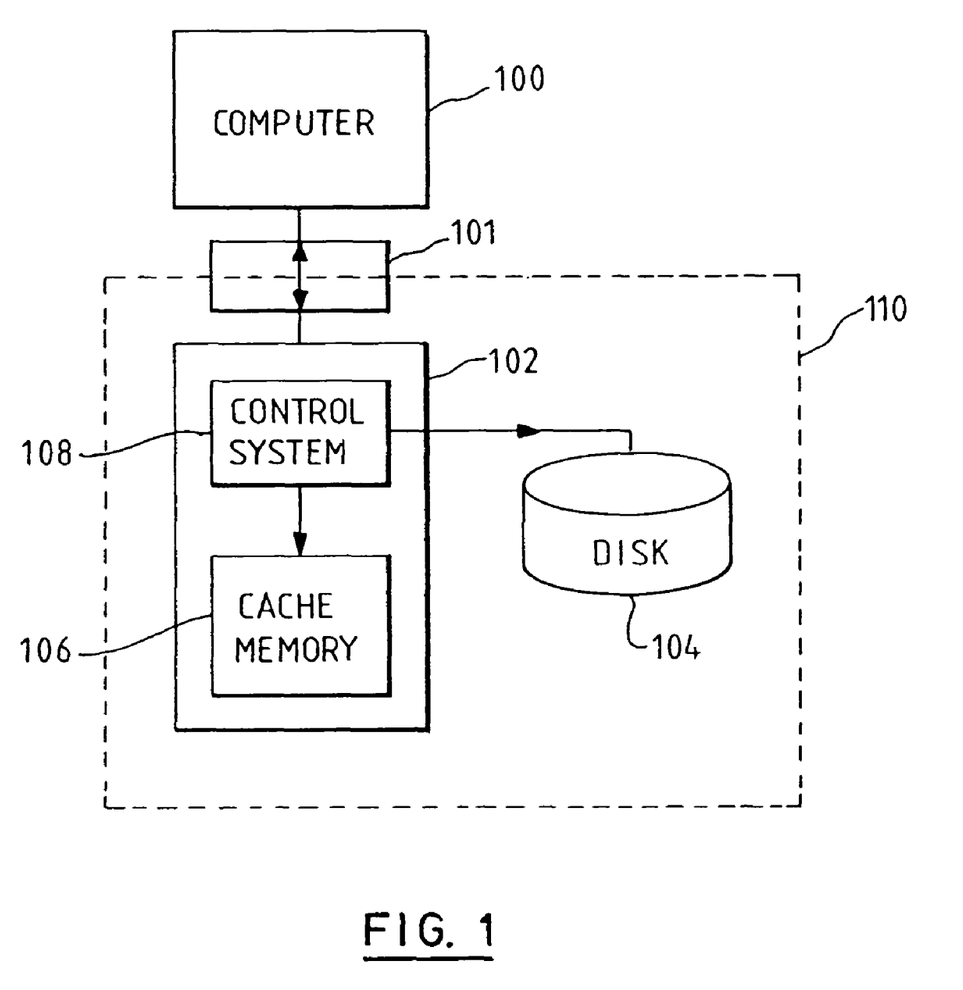
FIG. 1 is a schematic diagram showing data storage apparatus.

Referring to FIG. 1, a data processing system comprises a computer 100 which is attached to a data storage apparatus 110 via a SCSI (Small Computer Systems Interface) 101. The operation of a such an interface and the hardware and software required to implement it will be well understood by those skilled in the art and will not be described further here. It suffices for the purpose of the present description that the data storage apparatus be responsive to read and write requests passed from the computer via the interface to fetch and store data.

Data storage apparatus 110 comprises: magnetic disk storage device 104 which has, in this example, a capacity of 120 Megabytes; cache system 102 which includes non-volatile solid-state cache memory 106 having a capacity, in this example, of 2 Megabytes and cache control or management logic 108. The cache control system 108 includes a suitable microprocessor together with associated control code to enable it to perform the various functions described herein and cache management tables for storing control data for the cache memory and data storage devices.

The magnetic disk storage device 104 is of a type well known in the art and comprises a rotatably mounted magnetic disk together with a drive motor, a read/write head assembly and an associated control system.

It will be understood that whilst the example of a magnetic disk storage device is used for the purposes of this discussion, the invention would be equally applicable to any data storage device having a movable component such as an optical disk drive or the like.

In this embodiment, the data storage apparatus is in the form of an integrated disk storage subsystem so that it appears to the computer 100 as a single addressable entity with data transfers between the cache memory and the data storage device being performed over private data transfer lines within the apparatus. However, with suitably arranged data buses, the functions of the cache control system could equally be performed by the computer itself.

The disk storage device 104 has 3 possible states: standby, idle and active. In the active state the disk is rotating at operating speed and Read/Write and Seek operations are performed. The typical power required in this state can be between 1.5 W and 2.5 W. In the idle state the disk is still at operating speed and the typical power consumption is 0.9 W. There is no power overhead when going from the idle state to the active state. The standby state in which the disk is stationary has the lowest power consumption—typically 0.2 W. Switching from the standby state to the active state necessitates the disk to be brought to operating speed. This spin-up typically requires a power of up to 4 W over the acceleration time. The acceleration time is relatively long compared to an I/O operation.

An example of a commercially available disk drive of this type is the Maxtor 2.5 inch disk drive model number 25252A. Its power ratings are as follows: spin-up power is 2.8 W and the drive takes 2s to reach operating speed; active power is 1.6 W; idle is 0.9 W; standby is 0.1 W.

The data in the storage apparatus is arranged in sectors, which are the smallest addressable unit of data on the disk. Each sector contains, for example, 512 bytes of data.

The cache memory 106 contains data corresponding to n sectors S1, . . . , Sn of the disk. Each in-cache sector can be in one of three states:

(i) Invalid. A sector which is designated Invalid does not contain meaningful data.
(ii) Consistent. A sector which is designated Consistent contains the same information as that stored on the corresponding disk sector.
(iii) New. A sector which is designated New contains information fresher than that stored on the corresponding sector on the disk.

The cache control system collects statistics relating to access patterns to sectors on the disk in a cache management table and tries to guess, using these statistics, the behavioral patterns of the sectors in the given system.

Figure 2A:
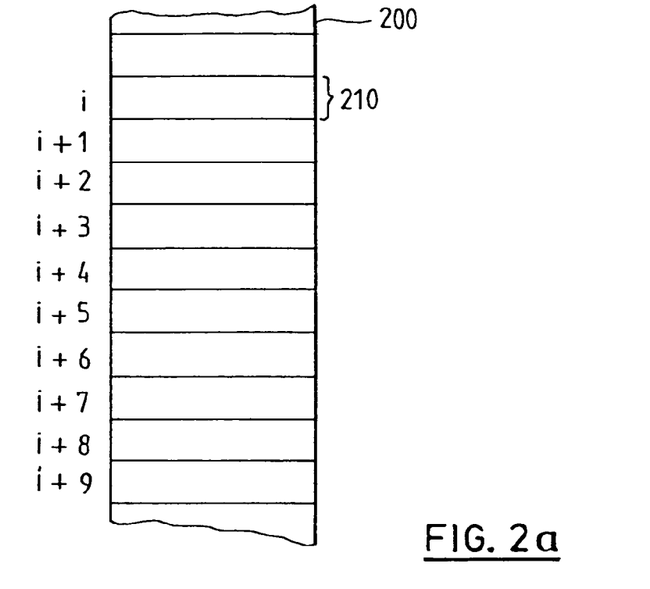
FIGS. 2a and b illustrate data structures stored in the cache control mechanism.

FIG. 2a is a schematic diagram showing the cache management table 200 of the cache control system. For each sector of the disk Si, there is an entry 210 in the table.

Each entry contains information conventionally stored for sectors of a cache memory, such as an indication that the sector is in-cache and its status if it is (New, Consistent, or Invalid), time stamps and the like. This conventional information is not shown in FIG. 2a.

Figure 2B:
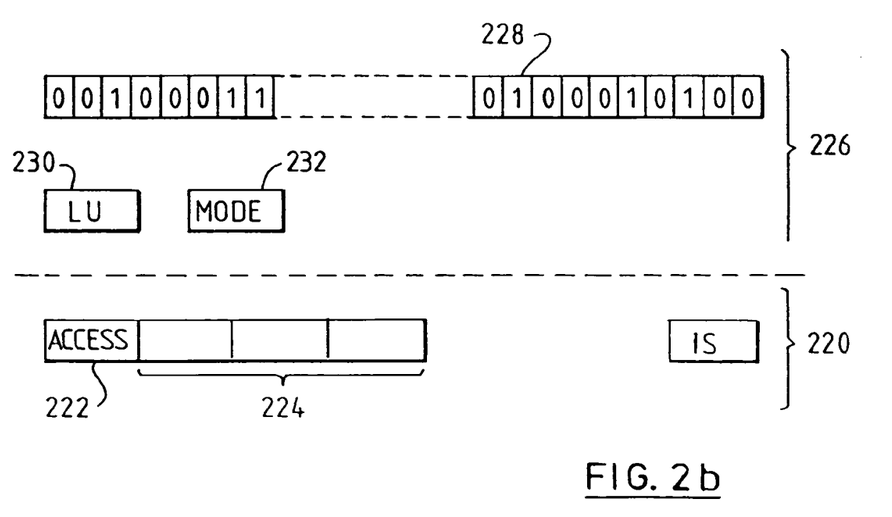

In addition, each entry contains the following information illustrated schematically in FIG. 2b.

Each entry contains the following data 220 relating to the data access history of the sector:

(1) a historical indication 222 which indicates the status of the recent access history of the sector; and
(2) three reference counts 224 which indicate the number of times the sector was accessed on the last three occasions it was brought into the cache.

The purpose of the historical reference indication is to identify sectors that once brought into the cache are not referenced again. If this pattern is repetitively observed these sectors need to be passed directly to the system in subsequent invocations to allow better utilization of the cache space.

The historical reference indication 222 is a variable that is initially set to a value of −1 that indicates that a proper value has not yet been set. When the sector is accessed for the first time the historical indication is set to another value, e.g., 1 to indicate that the sector has been accessed. If the three reference counts are all zero, the historical indication is set to a third value, eg 0, to indicate that the sector was not accessed on the recent occasions when it was brought into the cache.

Also stored in the table entry is affinity information 226. The affinity information 226 describes which sectors are usually loaded during the same time interval.

In addition to the information stored in the cache management table 200, certain global information is also stored by the cache management system. This global information includes various system parameters and tunable parameters and a table of the sector IDs of the sectors for which read requests have most recently been received during a certain time window as will be explained below. These sectors will be referred to as the current generation window.

In the following, the term 'generation' will be used to refer to a sufficiently short time interval during which all sector reads issued are suspected to come from the same or related applications. This time period is a tunable parameter that is used by the cache control unit for managing the cache.

A group of sectors will be referred to as 'contemporaries' if they are brought into memory within the same generation. A contemporary group might have one or more members. If a sector that belongs to a contemporary group is accessed there is a high likelihood that other members of the group will also be accessed.

In cache management table 200, the affinity information comprises a bit map 228, having a bit for every sector of the disk. The bit map is used as a set data structure which records the contemporary group for the sector. It will be appreciated that other structures are possible for this information. For example, another possible implementation could use a tree structure.

The data in the cache management table is continuously updated and refined to allow the system to "learn" the patterns of usage in order to maximize the energy saving.

The affinity between sectors is calculated using the generation parameter. Sectors that are believed to be brought in by the same application or related applications as any one particular sector are marked in the bit map as contemporaries of the sector and brought into the cache together with it each time the sector is brought into the cache.

The contemporary information is dynamically updated to reflect factors such as coincidence rather than logical affinity in the original affiliation decision, changes in the usage pattern or reallocation of the sector to a new file.

The algorithm for updating the contemporary groups takes into account the facts that any update algorithm is an approximation used to predict the access pattern of the disk and that to err by bringing an unneeded sector into the cache consumes less energy than to err by missing a needed sector.

The aim of this algorithm is to keep in the same contemporary group sectors which have been frequently and recently accessed together within a short time interval.

The identity of the sectors for which read requests have been issued within a time window of a generation is maintained by the cache control system as explained above. This information is used in order to update the contemporary group of a sector each time it is brought into the cache from the disk.

For each sector in the contemporary group two integers are maintained in the cache management table: Mode 232 and LU (Last Updated) 230.

Figure 3:
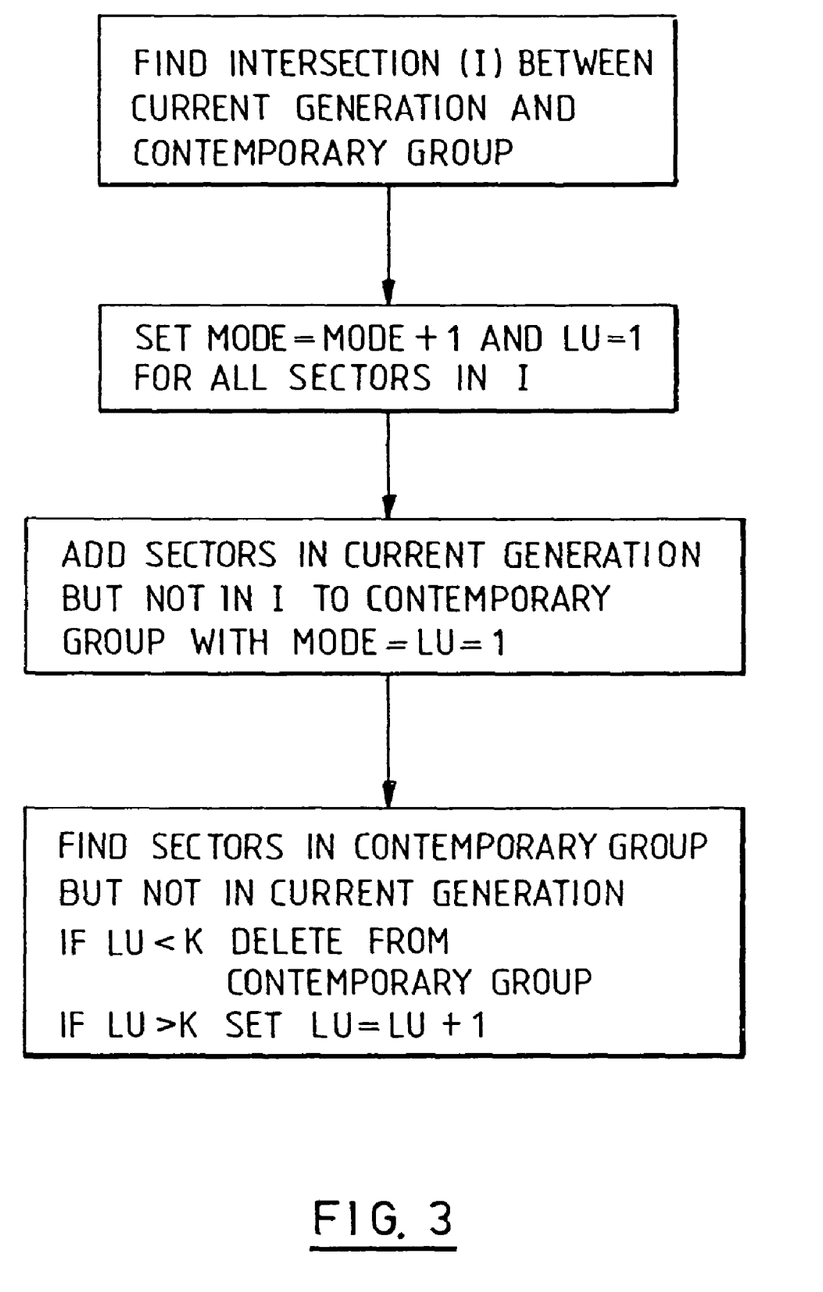
FIG. 3 is a flow diagram showing steps performed when a sector is transferred from disk to cache.

Each time that a sector is transferred from the disk to the cache the process illustrated in FIG. 3 is performed. The contemporary group of the sector is compared with the identity of the sectors in the current generation window. The Mode value of sectors in the intersection of the sets is incremented by one and their LU value is set to 1. Sectors that are in the current generation window but not in the contemporary group are added into the contemporary group of the sector being transferred with Mode value of 1 and LU value of 1. Sectors that are in the contemporary group and not in the current generation window are deleted from the contemporary group of the sector being transferred if their LU value is greater than a predetermined value k. Otherwise their LU value is incremented by one and their Mode is left unaltered. The Mode value is used when moving data to the cache since contemporary segments are read in nonincreasing order of Mode.

The whole contemporary set is transferred from the disk only if enough space is available in the cache. When writing to the cache all Invalid or Consistent sectors may be replaced, but it is not possible to replace New sectors. When there are not enough invalid or consistent sectors in the cache, the mode value comes into play and only as many sectors as space permits are read into the cache. Conveniently, the size of the cache is selected so that most of the time the whole contemporary group can fit in the cache.

Ideally the cache management table should store information relating to all sectors on the disk. When storage space is insufficient, information on the more frequently used sectors can be kept in a hash-table structure as will be well understood by those skilled in the art.

The cache control system has a cache replacement mechanism which performs two main tasks: destaging i.e., transferring data from the cache to disk, and replacement.

The cache control system executes destage operations only when the disk is spinning anyway. Only New sectors are destaged. Each sector which has been destaged is marked Consistent.

The term 'idle stretch' (IS) of a sector will be used to refer to the current time minus the most recent time that any sector in its contemporary group was used. Thus each sector in a contemporary group has the same idle stretch. The idle stretch for each sector is stored in the entry for the sector in the cache management table 200 as shown in FIGS. 2a and 2b.

Destaging is performed by arranging the sectors S1, . . . , Sn in the 'New' state in the cache in nonincreasing order of their IS value and in an ascending order according to the sector ID within the same IS value. This ordering avoids destaging sector groups which might soon be re-accessed. Ordering using the sector ID as a secondary key minimizes the destaging seek time. The order in which Sectors are destaged will be referred to as the Destaging Order.

Each time a read or write request has given rise to an access to the disk storage device, a destage takes place for a certain period of time if there are New sectors in the cache. The maximum period of time for which destaging takes place on each occasion is determined by allocating a certain energy budget to it. For example, if keeping the disk in active state for t time units takes about the same energy as is required to spin up the disk, then, destaging will occur during at +b units of time, where a and b are system-dependent tunable parameters.

The parameters a and b should be adjusted so that this time interval is sufficiently long to amortize the energy required to bring the disk to operating speed. This period will be referred to as the destaging interval.

The destage operation, i.e., the transferring of data from the cache 106 to the data storage device 104 transforms New sectors in the cache into Consistent sectors. This is one part of the cache replacement mechanism.

The cache replacement mechanism obeys the following rules for replacing sectors in the cache. A New sector is replaced only as a result of a Write operation which provides a fresher version of that sector. It then remains New. A New or Consistent sector becomes Invalid if a Write operation is performed directly to the data storage device 104 bypassing the cache.

A Consistent or Invalid sector may be replaced either (i) as a result of a Write operation of a new sector or a fresher version of the same sector in which case it then becomes New or (ii) as a result of a Read operation which brings a sector into the cache from the disk. It then remains or becomes Consistent.

Figure 4:
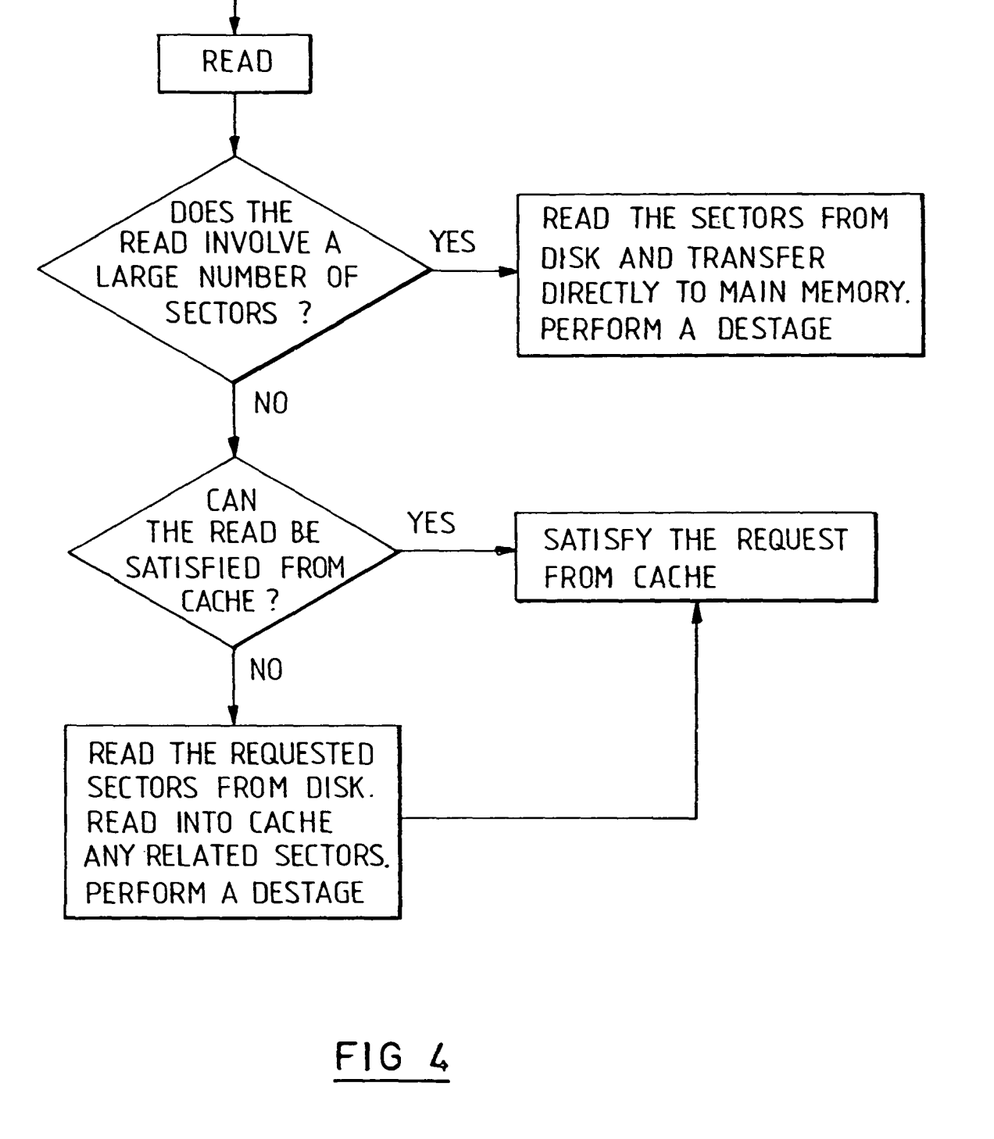
FIG. 4 is a flow diagram showing the operation of data storage apparatus during a read operation.
Figure 5:
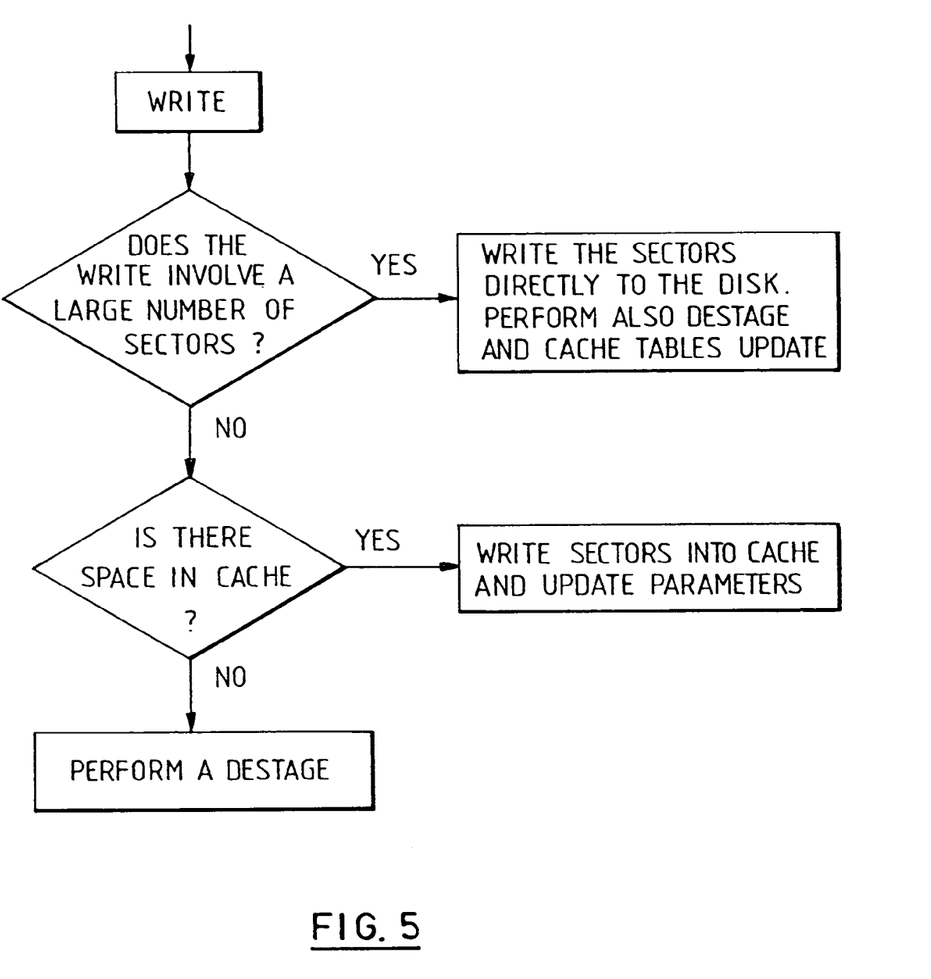
FIG. 5 is a flow diagram showing the operation of data storage apparatus during a write operation.

The methods used by the cache control system to handle read and write requests from the computer 100 are shown in FIGS. 4 and 5 respectively. A distinction is made between different I/O request patterns as described in the following.

As shown in FIG. 4, any read request is examined to see if the request is for more than a predetermined number of sectors. This threshold will be dependent on the size of the cache and the characteristics of the disk. Such large requests are satisfied by transferring the data directly from the disk to the main memory of the computer 100. Since the disk is in the Read/Write state and the disk must be accelerated to its operating speed, any required destaging is also performed for a period of time equal to the destaging interval.

The threshold will be determined by the cache size. Large I/O requests will not fit into the cache and will inevitably require disk activations. There is thus no point is satisfying these from the cache.

If the read request is for a number of sectors less than the threshold, then the request is satisfied from the cache. If a cache miss occurs, the disk will be activated, the read request for that sector will be satisfied from the disk and missing sectors as well as related sectors may be read into the cache. In the event of a cache miss, a destage is performed if necessary as before since the disk is already active.

As shown in FIG. 5, a write operation follows the same philosophy. If the write request is for a large number of sectors, then they are written directly to the disk. If necessary, a destage is performed at this opportunity. If the write is not large then the sector is written to the cache.

Thus, when reading data three subcases may arise. If the cache contains all the requested information, then the request is served from cache. If the cache does not contain all the requested information and the amount of data to be read is above the threshold, i.e., is large, then the data flowing from the disk to the system will not be stored in the cache. In other words, in this case, the cache content is not changed.

If the cache does not contain all the requested information and the amount of data to be read is below the threshold, i.e., is small, and there are enough Invalid or Consistent sectors in the cache, then the data unavailable in the cache will be read from the disk.

When any particular sector is accessed on the disk following a cache miss resulting from a read request, its historical reference indication 222 is used to determine whether or not it is transferred to the cache by distinguishing between the three possible cases.

If the historical reference indication indicates that it has been recently accessed, then the sector and its contemporaries are read into the cache. The latest reference count of the sector is set to 1. The latest reference count of its contemporaries is set to 0.

In the case where the historical reference indication is not set, the sector is moved both to the cache and the system; its latest reference count is set to 1. In this case, the set of contemporaries comprise of only that sector, since the set of contemporaries is initially an empty set.

If the historical reference indication shows that the sector has not been recently accessed, then only its contemporaries are read into the cache. Sector s itself is passed to the system, but not read into the cache. The latest reference count of the sectors in the contemporary group is set to 0.

When writing data only two subcases may arise. When writing a small amount of data, each sector which exists in the cache is replaced by the newer version, and is marked New. Sectors not already in the cache are written into the cache, by replacing other existing consistent sectors, if there is a sufficient number of these.

When writing an amount of data more than the threshold to the disk, the cache sectors which contain data on which the system is writing, are marked Invalid, but the actual Write operation goes directly to the disk.

Figure 6:
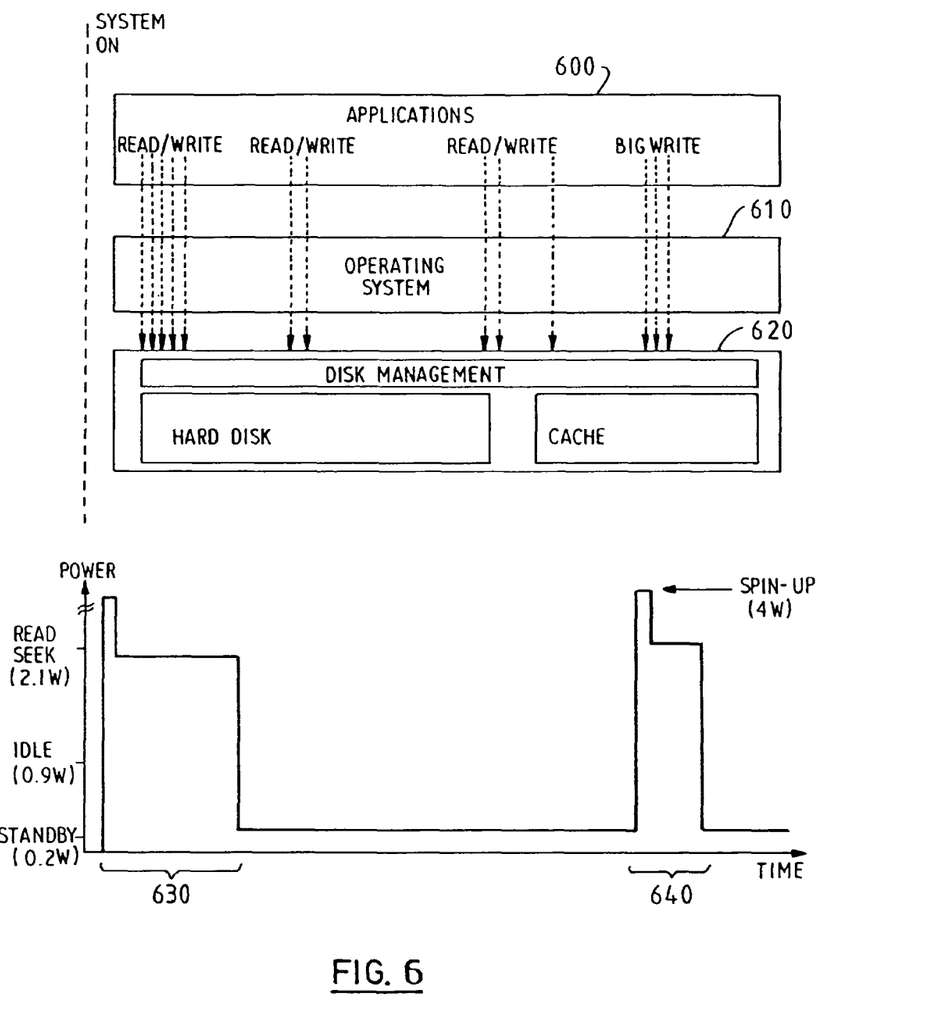
FIG. 6 shows a graph of the power consumption against time of data storage apparatus in operation.

FIG. 6 is a schematic diagram illustrating the use of a system with such apparatus. An application program 600 running on the computer gives rise to read and write requests to disks which are passed under the control of operating system 610 to the disk storage subsystem 620.

When the user starts the system, all the applications are loaded and relevant sectors are loaded into the cache. Once this initial phase 630 is over, the disk goes to its lowest energy state and stays there until either a read miss, a large read or a large write occurs, in which event the energy consumption increases as shown at 640. In practice, the disk will be in the standby position most of the time.

This particular design of the data storage apparatus preserves the external interface of the disk, and needs no special support at the system level whatsoever.

The effectiveness of the cache is due to the fact that the memory which the cache is made of consumes less power than the disk when it is in idle state. Disk activations and duration of activations are budgeted to conserve energy.

The principle of locality of access means that it is possible to maintain in the cache a subset of all the sectors, and ensure that access to the disk is relatively rare. It is the principle of locality that allows the right sectors to be effectively maintained in the cache.

There are three types of locality, macro spatial, micro spatial and temporal. The first two relate to the reference pattern the third relates to time. An application is said to have a good microspatial locality if, within the same execution, the probability of accessing data located near the currently accessed data is higher than accessing other data. An application is said to have a good macrospatial locality if the set of sectors accessed by a program does not vary from execution to execution. An application is said to have a good temporal locality if there is a high likelihood of accessing data which was recently accessed.

The tunable parameter generation together with the destaging order allow us to follow the principle of locality and maintain the sectors that are most likely to be accessed in the cache for small read and write requests.

The historical indication maintained with every sector allows advantage to be taken of temporal locality. The use of groups of contemporary sectors together with the historical reference indication allows us to retain the sectors with good spatial locality in cache.

Advantage is taken of the fact that most applications work with very small files. The typical size of a file in the UNIX operating system, for example, is smaller than 4 KB (UNIX is a trademark of Unix System Laboratories Inc).

Thus, like the traditional cache memory it is designed on the basis of the principle of locality, but that is the only similarity. Unlike traditional cache, the memory it is made of is not necessarily faster, but only has to consume less power.

We claim:

1. A data storage system for fulfilling read and write requests from a computer comprising:
    a solid-state cache memory;
    a storage element with at least one moving part wherein the storage element has an operating, and a non fully operating mode when data access has not occurred for a predetermined time period;
    a cache control system responsive to read and write requests from the computer, said cache control system further comprising,
    means to access data stored on the storage element if a read or write request cannot be satisfied via access to the cache memory;
    means for accessing data stored within the cache memory if a read or write request from the computer can be satisfied via access to the cache memory;
    means for designating selected data within said cache memory as new data in response to a write request from the computer which updates data within the cache memory; and
    a cache replacement mechanism for transferring new data from the cache memory to the storage element to maintain consistency of data between data stored in the cache memory and data stored in the storage element, wherein the cache replacement mechanism performs data transfers between the cache memory and the storage element when the storage element is at operating speed as a result of a read or write request which requires an access to the storage element.

2. The data storage apparatus of claim 1 wherein the cache replacement mechanism carries out transfers of new data from the cache memory to the storage element for a predetermined time each time a read or write request has given rise to an access to the storage element.

3. The data storage apparatus of claim 1 wherein the cache control system further comprises means for accessing the data on the storage element without modifying the data in the cache memory if the read or write request involves more than a predetermined amount of data.

4. The data storage apparatus of claim 1 wherein the storage element with at least one moving part is an optical drive.

5. The data storage apparatus claim 4 in the form of a disk storage subsystem for use with a personal or portable computer.

6. The data storage apparatus of claim 1 wherein the storage element with at least one moving part is an magnetic disk drive.

7. The data storage apparatus claim 6 in the form of a disk storage subsystem for use with a personal or portable computer.

8. The data storage apparatus of claim 1 wherein the storage element with at least one moving part is an magnetoptical disk drive.

9. The data storage apparatus claim 8 in the form of a disk storage subsystem for use with a personal or portable computer.

10. The data storage apparatus of claim 1 wherein the solid state cache memory is non-volatile.

11. The data storage apparatus claim 10 in the form of a disk storage subsystem for use with a personal or portable computer.

12. A method for operating data storage apparatus having a storage element including at least one moveable part and a solid-state cache memory in which the storage element is in a non-fully operational mode when data access has not occurred during a predetermined time period, the method comprising the steps of:
    accessing data on the storage element in response to a read or write request which cannot be satisfied via access to the cache memory;
    accessing data stored within the cache memory if a read or write request from the computer can be satisfied via access to the cache memory;
    designated and selected data within said cache memory as new data in response to a write request from the computer which updates data within the cache memory; and
    transferring new data from the cache memory to the storage element to maintain consistency of data therebetween, said data transfers between the cache memory and the storage element being performed when the storage element is fully operational as a result of a read or write request has given rise to an access to the storage element.

* * * * *